United States Patent
Lu

(10) Patent No.: US 8,049,381 B2
(45) Date of Patent: Nov. 1, 2011

(54) END COVER AND EXTERNAL ROTOR MOTOR USING THE SAME

(75) Inventor: Chuping Lu, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 130 days.

(21) Appl. No.: 12/581,181

(22) Filed: Oct. 19, 2009

(65) Prior Publication Data

US 2010/0102660 A1    Apr. 29, 2010

(30) Foreign Application Priority Data

Oct. 23, 2008  (CN) ...................... 2008 2 0202461 U

(51) Int. Cl.
*H02K 5/00* (2006.01)
(52) U.S. Cl. ........................................ 310/67 R; 310/90
(58) Field of Classification Search ............... 310/67 R, 310/90, 91, 89
See application file for complete search history.

(56) References Cited

U.S. PATENT DOCUMENTS

| | | | | |
|---|---|---|---|---|
| 4,682,065 A * | 7/1987 | English et al. | ................... | 310/90 |
| 5,363,003 A * | 11/1994 | Harada et al. | ............... | 310/67 R |
| 5,610,462 A * | 3/1997 | Takahashi | ........................ | 310/90 |
| 6,072,261 A * | 6/2000 | Lin | ................................ | 310/424 |
| 6,617,736 B1 * | 9/2003 | Horng et al. | .................... | 310/91 |
| 6,654,213 B2 * | 11/2003 | Horng et al. | .................... | 361/23 |
| 6,819,021 B1 * | 11/2004 | Horng et al. | .................... | 310/91 |
| 6,882,074 B2 * | 4/2005 | Horng et al. | .................... | 310/90 |
| 7,023,116 B2 * | 4/2006 | Kuribara | ......................... | 310/90 |
| 7,091,639 B2 * | 8/2006 | Rojo Lulic | ...................... | 310/90 |
| 7,485,995 B2 * | 2/2009 | Ku et al. | ......................... | 310/91 |

* cited by examiner

*Primary Examiner* — Dang Le
(74) *Attorney, Agent, or Firm* — Matthias Scholl P.C.; Matthias Scholl

(57) ABSTRACT

An end cover for an external rotor motor. The external rotor motor has a stator core having a center hole, and the end cover including a body, a cylindrical connecting portion, and multiple protruding bars each having an arc-shaped top surface. The cylindrical connecting portion is extended from the center of the body and received in the center hole of the stator core, the protruding bars are disposed on outer surface of the cylindrical connecting portion and extended in an axial direction, and the arc-shaped top surface of the protruding bar is fit with inner wall of the center hole of the stator core. The end cover is accurately fit with a stator core, requires no further processing after die-casting and thus reducing production cost, and is capable of preventing aluminum scraps from entering a stator.

4 Claims, 7 Drawing Sheets

END COVER AND EXTERNAL ROTOR MOTOR USING THE SAME

CROSS-REFERENCE TO RELATED APPLICATIONS

Pursuant to 35 U.S.C. §119 and the Paris Convention Treaty, this application claims the benefit of Chinese Patent Application No. 200820202461.7 filed on Oct. 23, 2008, the contents of which are incorporated herein by reference.

BACKGROUND OF THE INVENTION

1. Field of the Invention

The invention relates to an end cover and a motor using the same, and more particularly to an end cover and an external rotor motor using the same.

2. Description of the Related Art

A conventional motor comprises a stator, motor coil, along with a stator core and an end cover fit with each other. However, there are several problems with the motor: fitting precision is limited since the end cover cannot be directly die-casted and accurately fit with the stator core, and thus further processing is required, which increases production cost; moreover, aluminum scraps generated during the fitting process often enter one end of the motor coil and an air gap of the stator, and affect product quality.

SUMMARY OF THE INVENTION

In view of the above-described problem, it is one objective of the invention to provide an end cover that is accurately fit with a stator core, requires no further processing after die-casting and thus reducing production cost, and is capable of preventing aluminum scraps from entering a stator.

It is another objective of the invention to provide a motor having an end cover that is accurately fit with a stator core, requires no further processing after die-casting and thus reducing production cost, and is capable of preventing aluminum scraps from entering a stator.

To achieve the above objectives, in accordance with one embodiment of the invention, provided is an end cover for an external rotor motor, the external rotor motor comprising a stator core having a center hole, and the end cover comprising a body, a cylindrical connecting portion, and multiple protruding bars each having an arc-shaped top surface. The cylindrical connecting portion is extended from the center of the body and received in the center hole of the stator core, the protruding bars are disposed on outer surface of the cylindrical connecting portion and extended in an axial direction, and the arc-shaped top surface of the protruding bar is fit with inner wall of the center hole of the stator core.

In a class of this embodiment, a groove is formed between adjacent protruding bars.

In a class of this embodiment, a width of a front part of the groove is greater than that of a rear part thereof.

In a class of this embodiment, a bottom surface of the groove is arc-shaped.

In a class of this embodiment, a cross section of a lower part of the body is annular.

In a class of this embodiment, multiple flanges are extended from the lower part of the body to a center thereof.

In a class of this embodiment, the flange is received in the groove.

In a class of this embodiment, one end of the stator core abuts against a top surface of the flange.

In a class of this embodiment, a slot is formed between adjacent flanges and operates to receive aluminum scraps.

In a class of this embodiment, the slot is disposed at the bottom of the protruding bar.

In a class of this embodiment, a width of a front part of the protruding bar is less than that of a rear part thereof.

In a class of this embodiment, a pair of positioning ribs are disposed on the outer surface of the cylindrical connecting portion and extended in an axial direction.

In a class of this embodiment, a pair of positioning grooves are disposed on both sides of the center hole of the stator core.

In a class of this embodiment, the positioning rib is received in the positioning groove whereby preventing the stator core from rotating axially.

In accordance with one embodiment of the invention, provided is an external rotor motor, comprising a stator core having a center hole, and an end cover, comprising a body, a cylindrical connecting portion, and multiple protruding bars each having an arc-shaped top surface. The cylindrical connecting portion is extended from the center of the body and received in the center hole of the stator core, the protruding bars are disposed on outer surface of the cylindrical connecting portion and extended in an axial direction, and the arc-shaped top surface of the protruding bar is fit with inner wall of the center hole of the stator core.

In a class of this embodiment, a pair of positioning grooves are disposed on both sides of the center hole of the stator core.

In a class of this embodiment, a pair of positioning ribs are disposed on the outer surface of the cylindrical connecting portion and extended in an axial direction.

In a class of this embodiment, the positioning rib is received in the positioning groove whereby preventing the stator core from rotating axially.

Advantages of the invention comprise: 1) since the arc-shaped top surface of the protruding bar is fit with inner wall of the center hole of the stator core, high fitting precision is ensured, and no further processing is required, which reduces production cost and simplifies structure of the motor; 2) the groove formed between adjacent protruding bars operates as a taper face of the die-casting process, reduces difficulty of die-casting, simplifies a processing process, and does not generate aluminum scraps during the fitting process; 3) the flanges are received in the groove, which prevents aluminum scraps generated during the fitting process from affecting fitting precision, and ensures that an axial spacing dimension is accurate; 4) aluminum scraps generated by the protruding bar during the fitting process are received in the slot and cannot enter the motor, which improves safety of the motor; 5) a width of a front part of the protruding bar is less than that of a rear part thereof, which makes it convenient to be pressed and improves fitting strength between the protruding bar and the stator core; 6) a width of a front part of the groove is greater than that of a rear part thereof, which makes it convenient for die releasing, reduces production difficulty and ensures precision of die-casting of the protruding bar; 7) the top surface of the flange is flat and has no aluminum scraps, and therefore fitting precision between the flange and one end of the stator core is high.

BRIEF DESCRIPTION OF THE DRAWINGS

The invention is described hereinafter with reference to accompanying drawings, in which.

DETAILED DESCRIPTION OF THE EMBODIMENTS

Figure 1:
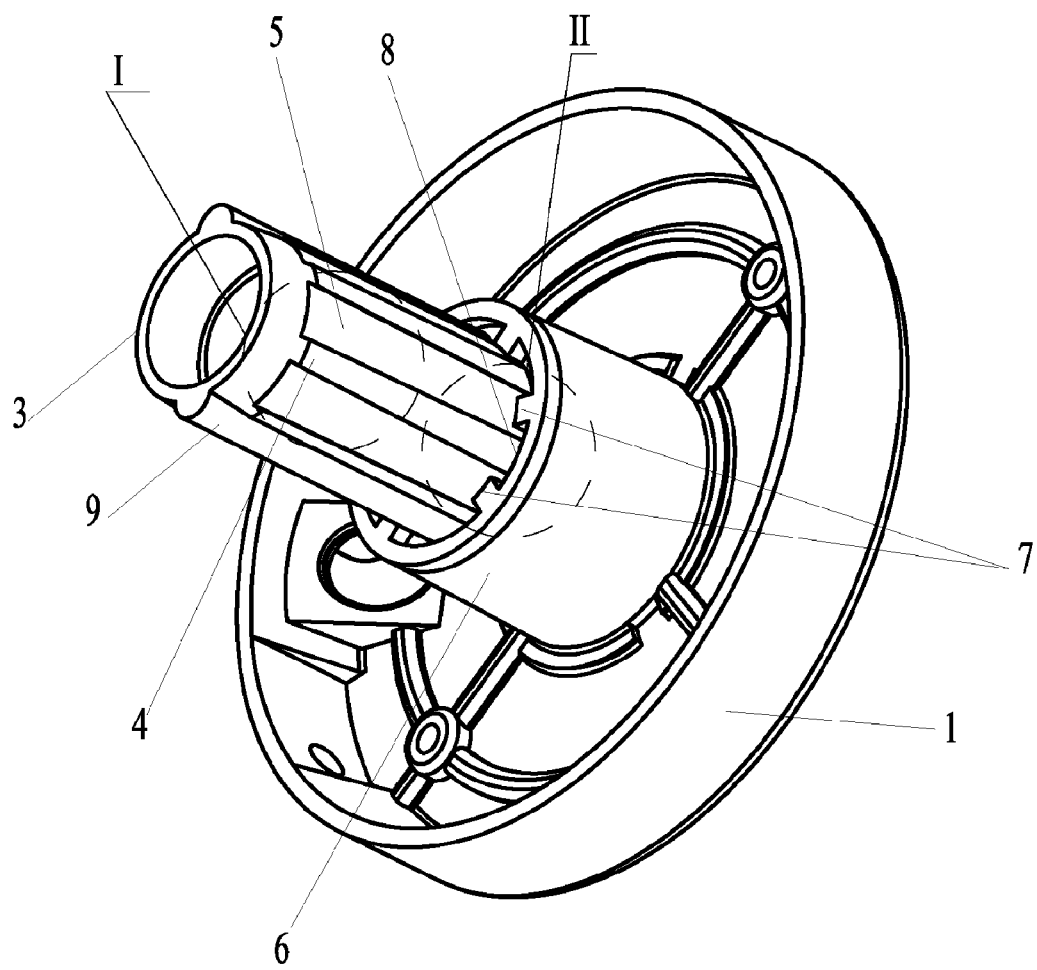
FIG. 1 is a schematic view of an end cover of an exemplary embodiment of the invention.
Figure 2:
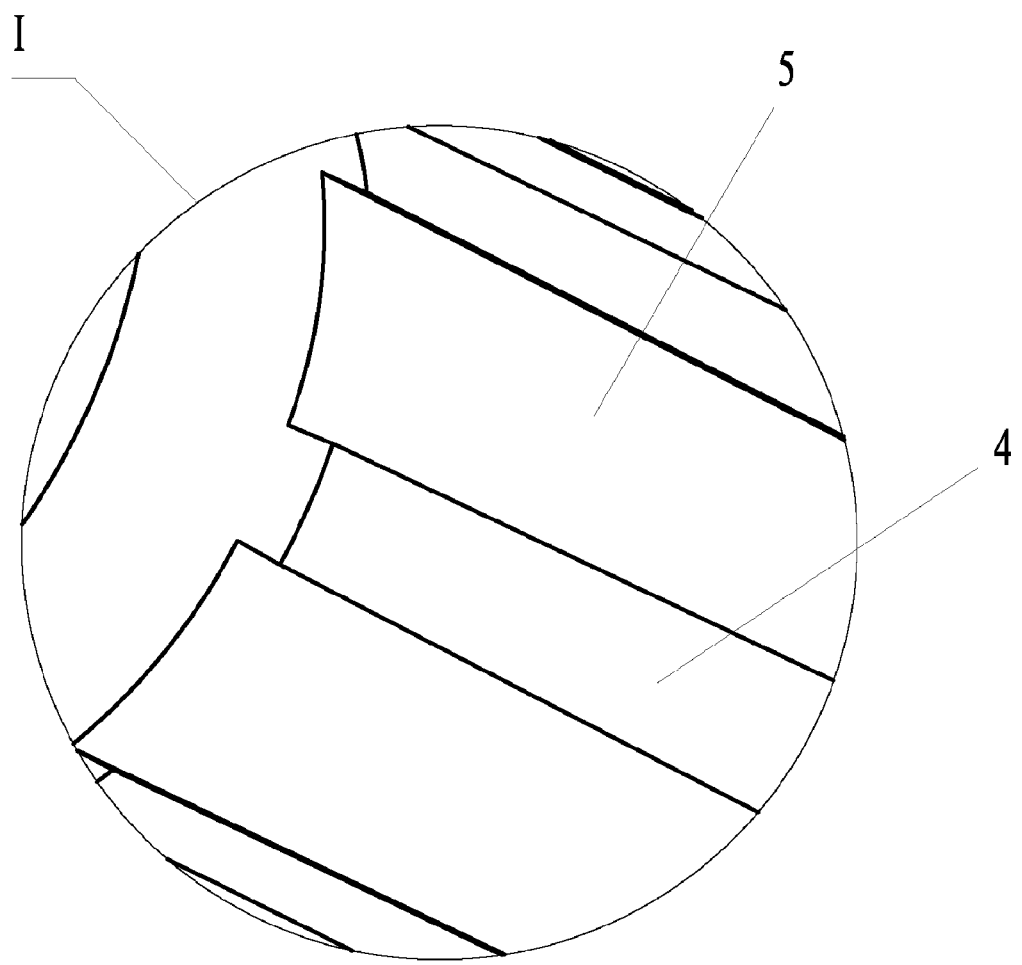
FIG. 2 is an enlarged view of a I portion of FIG. 1.
Figure 3:
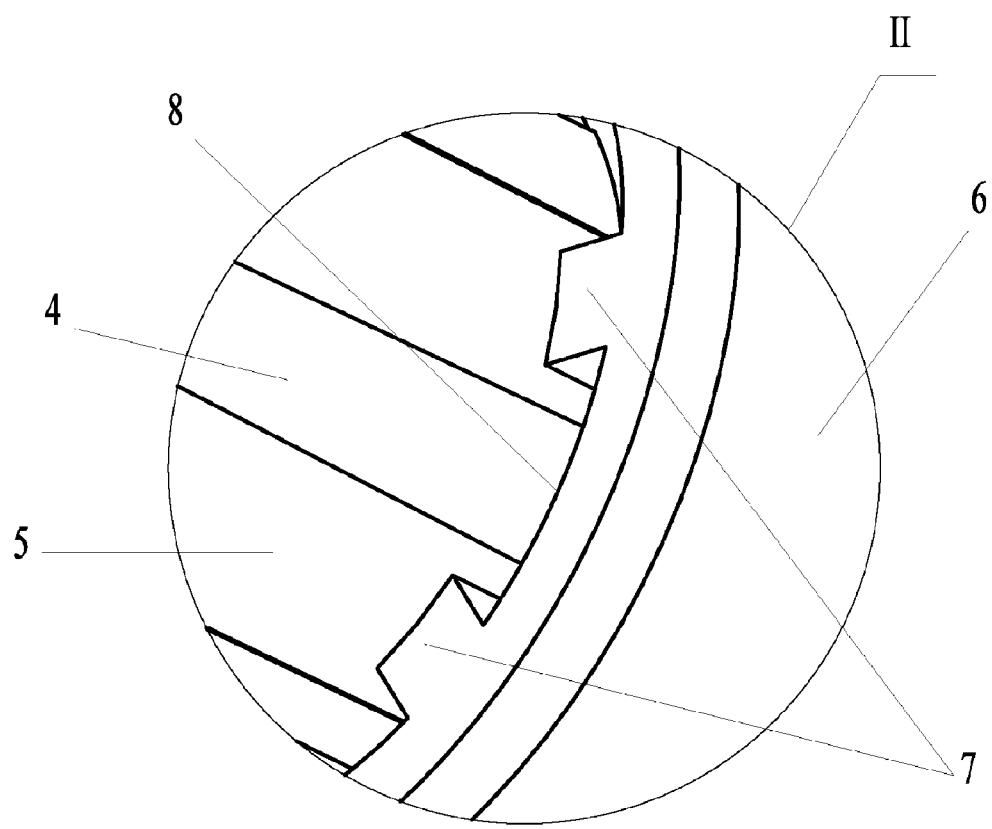
FIG. 3 is an enlarged view of a II portion of FIG. 1.
Figure 4:
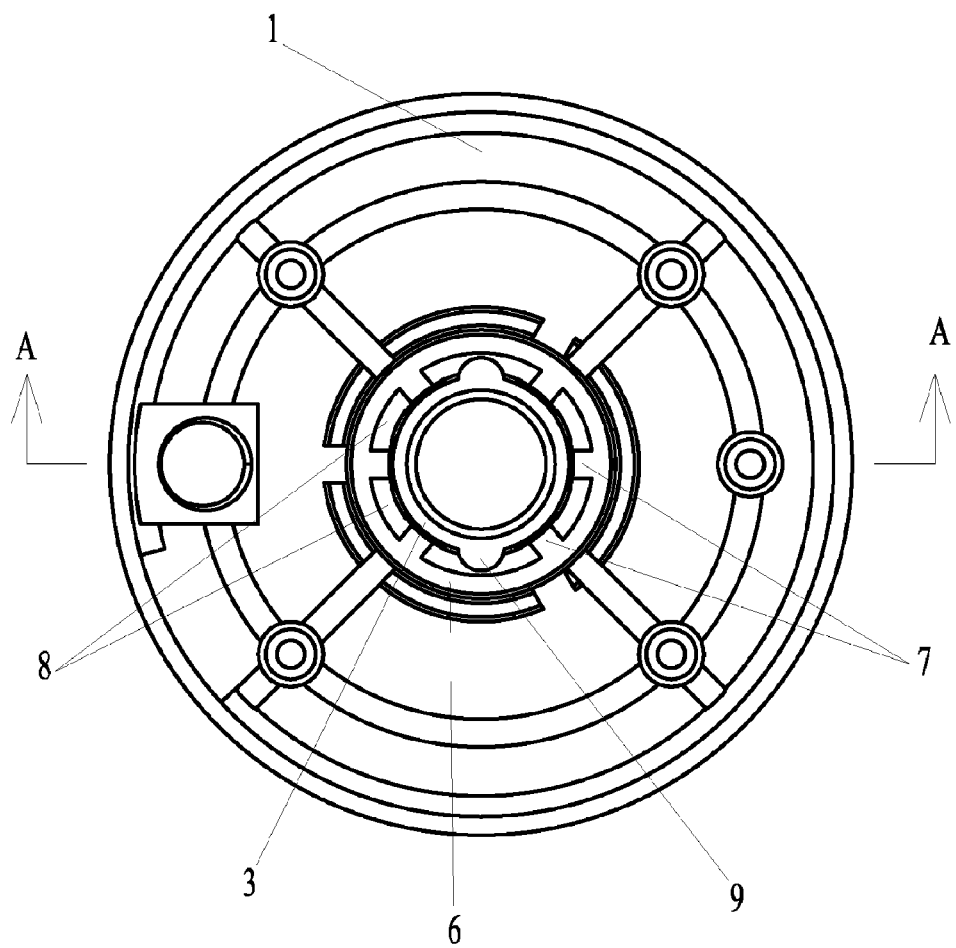
FIG. 4 is a top view of an end cover of an exemplary embodiment of the invention.
Figure 5:
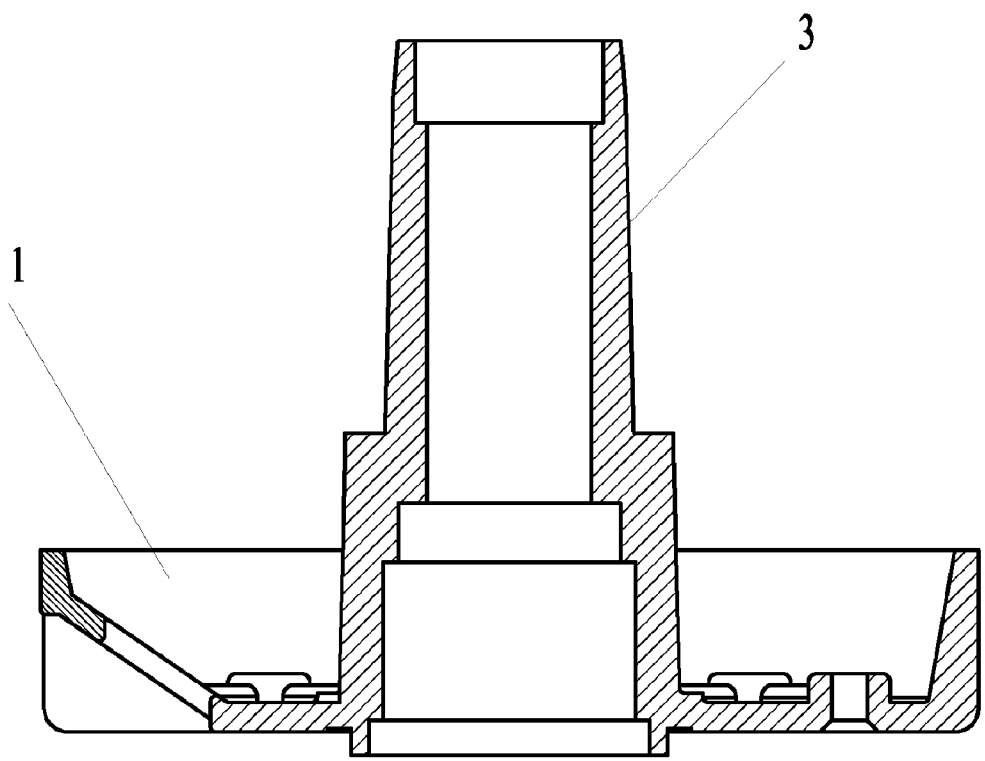
FIG. 5 is a cross-sectional view taken along the line A-A of FIG. 4.
Figure 6:
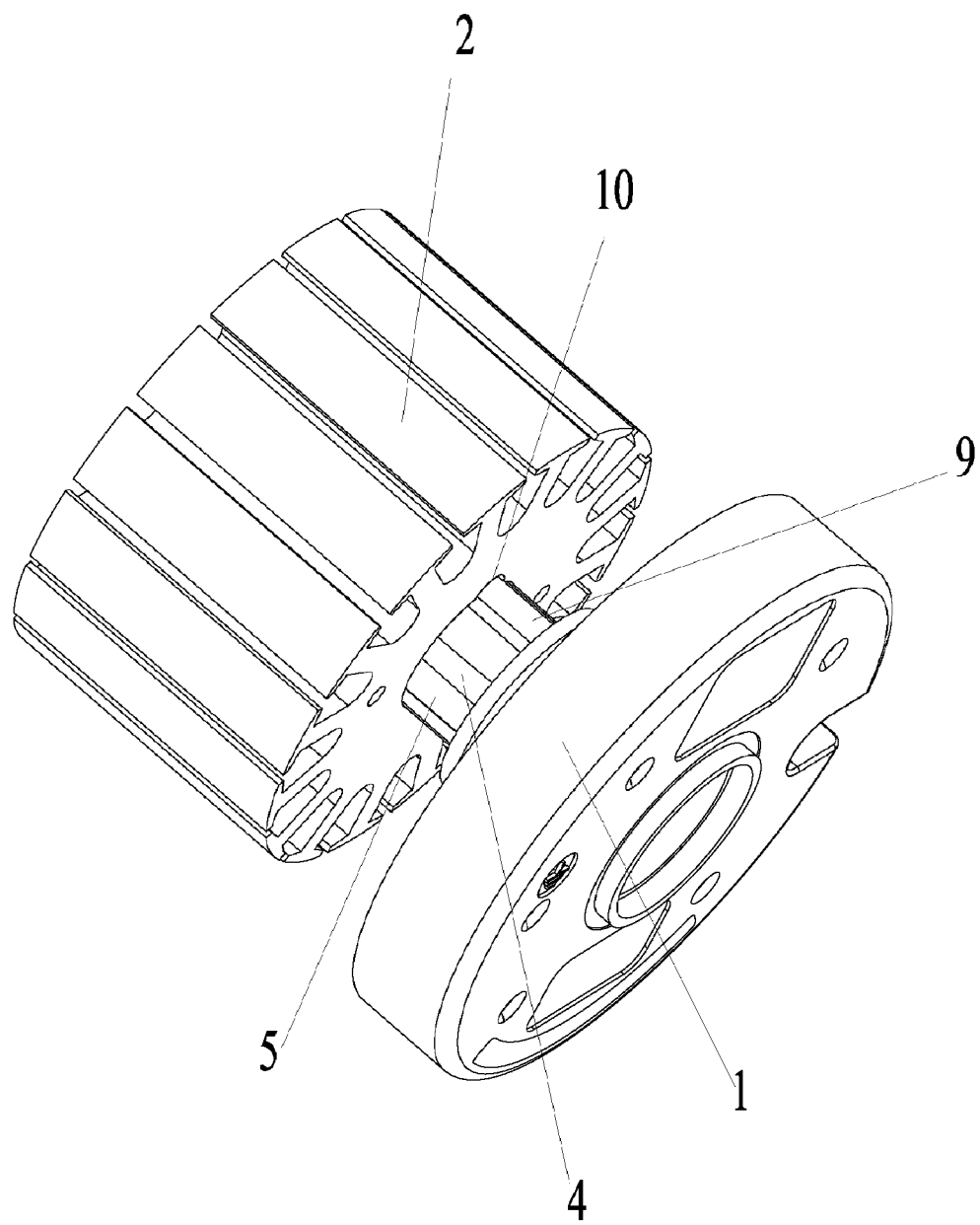
FIG. 6 is a schematic view of an end cover fit with a stator core.
Figure 7:
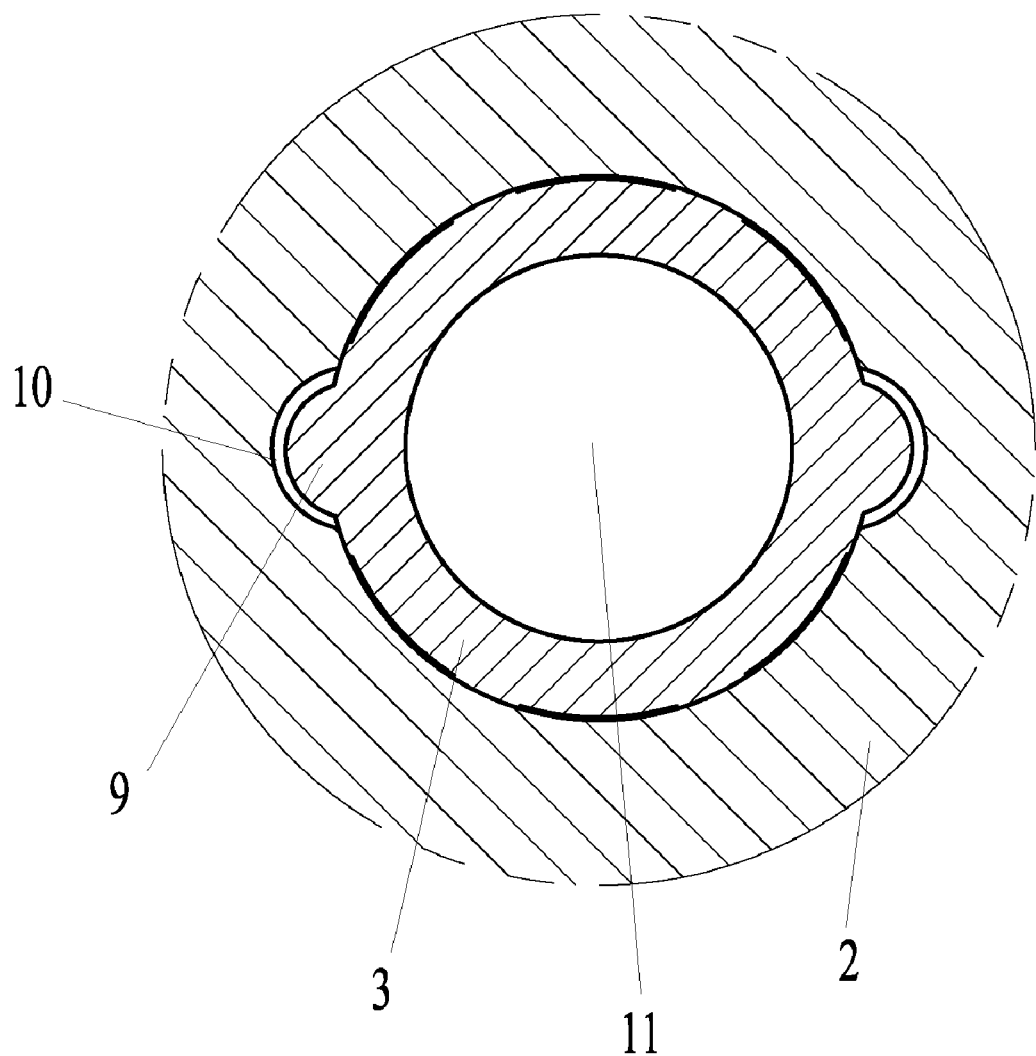
FIG. 7 is a partial cross-sectional view of an end cover fit with a stator core.

As shown in FIGS. 1-7, an end cover for an external rotor motor comprises a body 1, a cylindrical connecting portion 3, and multiple protruding bars 4.

The external rotor motor comprises a stator core 2 having a center hole 11. A pair of positioning grooves 10 are disposed on both sides of the center hole 11 of the stator core 2.

A cross section of a lower part of the body 1 is annular.

The cylindrical connecting portion 3 is extended from the center of the body 1 and received in the center hole 11 of the stator core 2.

The protruding bar 4 is disposed on outer surface of the cylindrical connecting portion 3 and extended in an axial direction, and has an arc-shaped top surface. The arc-shaped top surface of the protruding bar 4 is fit with inner wall of the center hole 11 of the stator core 2, and therefore high fitting precision is ensured and no further processing is required, which reduces production cost and simplifies structure of the motor.

A width of a front part of the protruding bar 4 is less than that of a rear part thereof, which makes it convenient to be pressed and improves fitting strength between the protruding bar 4 and the stator core 2.

A groove 5 is formed between adjacent protruding bars 4, and a width of a front part of the groove 5 is greater than that of a rear part thereof, which makes it convenient for die releasing, reduces production difficulty and ensures precision of die-casting of the protruding bar 4. A bottom surface of the groove 5 is arc-shaped.

The groove 5 operates as a taper face of the die-casting process, reduces difficulty of die-casting, simplifies a processing process, and does not generate aluminum scraps during the fitting process.

Multiple flanges 7 are extended from the lower part of the body 1 to a center thereof and received in the groove 5. One end of the stator core 2 abuts against a top surface of the flange 7. The flange 7 prevents aluminum scraps generated during the fitting process from affecting fitting precision, and ensures that an axial spacing dimension is accurate. The top surface of the flange 7 is flat and has no aluminum scraps, and therefore fitting precision between the flange 7 and one end of the stator core 2 is high.

A slot 8 is formed between adjacent flanges 7 and disposed at the bottom of the protruding bar 4, and operates to receive aluminum scraps, and thus aluminum scraps cannot enter the motor, which improves safety of the motor A pair of positioning ribs 9 are disposed on the outer surface of the cylindrical connecting portion 3 and extended in an axial direction. The positioning rib 9 is received in the positioning groove 10 whereby preventing the stator core 2 from rotating axially.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An end cover for an external rotor motor, said external rotor motor comprising a stator core having a center hole, said end cover comprising:
    a body;
    a cylindrical connecting portion; and
    multiple protruding bars each having an arc-shaped top surface; wherein
    said cylindrical connecting portion is extended from the center of said body and received in said center hole of said stator core;
    said protruding bars are disposed on outer surface of said cylindrical connecting portion and extended in an axial direction;
    said arc-shaped top surface of said protruding bar is fit with inner wall of said center hole of said stator core;
    a groove is formed between adjacent protruding bars;
    a cross section of a lower part of said body is annular;
    multiple flanges are extended from said lower part of said body to a center thereof; and
    said flange is received in said groove.

2. The end cover of claim 1, wherein one end of said stator core abuts against a top surface of said flange.

3. The end cover of claim 1, wherein a slot is formed between adjacent flanges and operates to receive aluminum scraps.

4. The end cover of claim 3, wherein said slot is disposed at the bottom of said protruding bar.

* * * * *